United States Patent [19]

Kimura et al.

[11] Patent Number: 5,375,246
[45] Date of Patent: Dec. 20, 1994

[54] BACK-UP POWER SUPPLY APPARATUS FOR PROTECTION OF STORED DATA

[75] Inventors: Kazumasa Kimura, Yamato-Koriyama; Masato Hiramoto, Soraku, both of Japan

[73] Assignee: Sharp Kabushiki Kaisha, Osaka, Japan

[21] Appl. No.: 749,443

[22] Filed: Aug. 26, 1991

[30] Foreign Application Priority Data

Aug. 30, 1990 [JP] Japan ................. 2-228727

[51] Int. Cl.⁵ .............................. G06F 1/00
[52] U.S. Cl. .................. 395/750; 365/226; 365/227; 365/229; 364/431.11; 364/483; 364/492; 371/66; 371/9.1
[58] Field of Search ............... 395/750; 365/226, 227, 365/229; 364/431.11, 483, 492; 371/66, 9.1

[56] References Cited

U.S. PATENT DOCUMENTS

| | | | |
|---|---|---|---|
| 3,859,638 | 1/1975 | Hume, Jr. | 365/229 |
| 4,323,987 | 4/1982 | Holtz et al. | 365/229 |
| 4,422,163 | 12/1983 | Oldenkamp | 365/229 |
| 4,461,003 | 7/1984 | Tamaki | 371/66 |
| 4,551,841 | 11/1985 | Fujita | 395/750 |
| 4,631,418 | 12/1986 | Toyomura | 395/750 |
| 4,658,352 | 4/1987 | Magasawa | 371/66 |
| 4,710,905 | 12/1987 | Uchida | 365/229 |
| 4,712,196 | 12/1987 | Uesugi | 365/229 |
| 4,777,626 | 10/1988 | Matsushita et al. | 371/66 |
| 4,823,323 | 4/1989 | Higuchi | 365/229 |
| 4,984,211 | 1/1991 | Tran | 365/229 |

FOREIGN PATENT DOCUMENTS

| | | |
|---|---|---|
| 0186832 | 7/1986 | European Pat. Off. . |
| 3625179A1 | 2/1987 | Germany . |
| 59-91525 | 5/1984 | Japan ................. 365/229 |
| 59-163619 | 9/1984 | Japan ................. 365/229 |
| 61-221668 | 10/1986 | Japan ................. 365/229 |
| 63-112894 | 5/1988 | Japan ................. 365/229 |
| 63-212226 | 9/1988 | Japan ................. 365/229 |
| 1-263708 | 10/1989 | Japan . |

OTHER PUBLICATIONS

Quinlivan et al., "On-Board Backup Supply Protects Volatile RAM Data", END, Apr. 1978.

*Primary Examiner*—Allen R. MacDonald
*Assistant Examiner*—George Davis
*Attorney, Agent, or Firm*—Nixon & Vanderhye

[57] ABSTRACT

A stored data protection apparatus for an electronic device has a CPU (20) and a volatile memory (21) controlled by the CPU for storing data therein. Both of the CPU and the volatile memory ace supplied power voltage from a main battery (22) in normal operation of the device. The volatile memory as supplied power voltage from a back-up battery (23) when the main battery is removed from the device. The apparatus has a switch (29) operable in first and second positions, taking the first position in the normal operation of the device, and being switched from the first position to the second position when the main battery is removed from the device, a circuit (44, 48) for inhibiting the CPU to access the volatile memory when the switch is in the second position, and a circuit (38, 34, 42, 43) for releasing the inhibition of the CPU by the inhibiting circuit when the switch is switched from the second position to the first position.

5 Claims, 4 Drawing Sheets

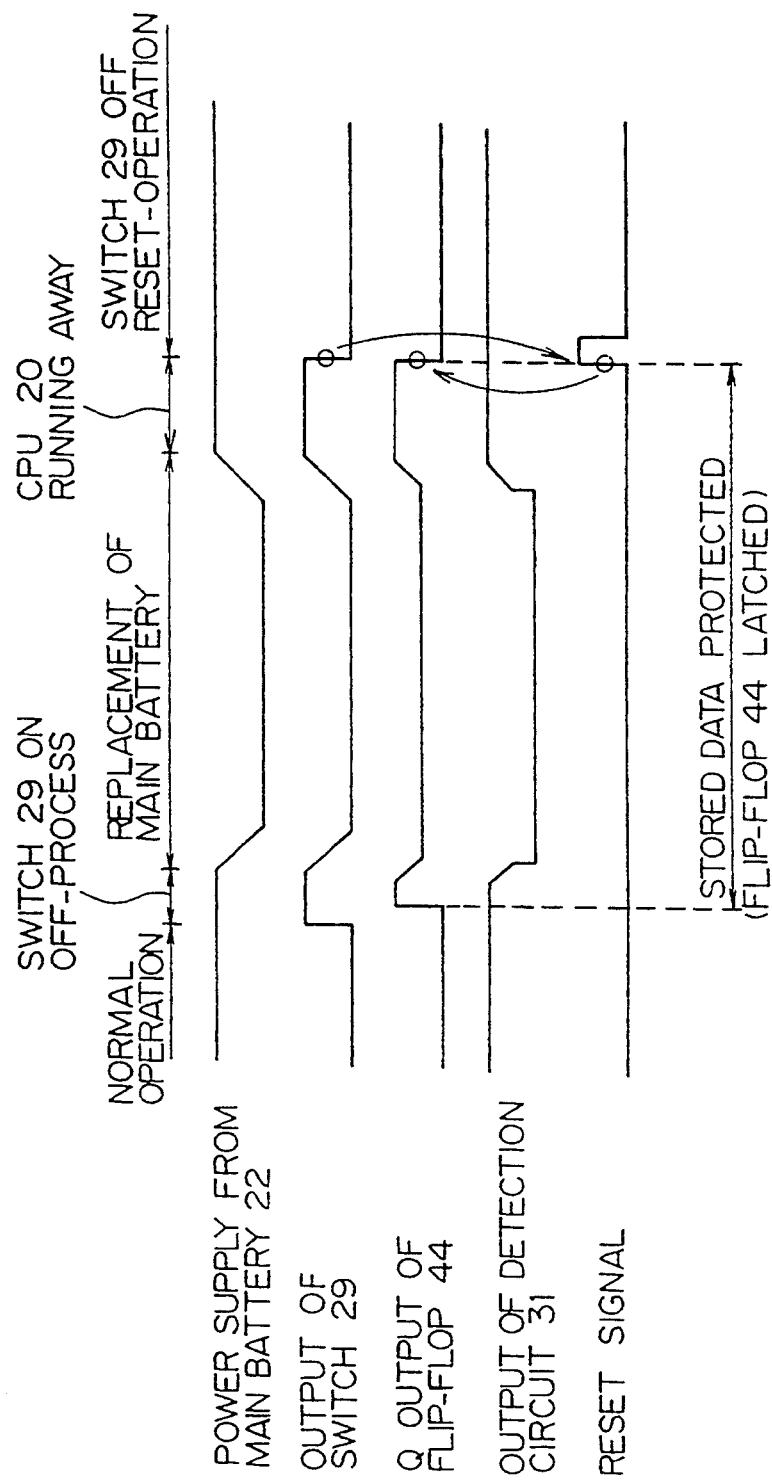

BACK-UP POWER SUPPLY APPARATUS FOR PROTECTION OF STORED DATA

BACKGROUND OF THE INVENTION

1. Field of the Invention

The present invention relates to a stored data protection apparatus for an electronic device such as electronic notebook, pocket computer and the like, having a volatile memory which maintains stored data by a battery power supply.

2. Description of the Related Art

In general, an electronic device having a computer, for example such as an electronic notebook, a pocket computer and the like carries a main battery for normally supplying power to both of a CPU (Central Processing Unit) and a RAM (Random Access Memory) in the device, and a back-up battery for supplying power to the RAM when the power supply voltage from the main battery is reduced or such main battery is taken out from the device for replacement, so as to prevent data stored in the RAM or other volatile memory from being destroyed.

In case that the main battery is replaced with a new one with the assistance of the back-up battery, a singing phenomenon often occurs in power supply voltage. More particularly, the singing phenomenon is most likely to occur when a new main battery is set in the electronic device. Such singing phenomenon may cause the CPU of the device to erroneously respond to its instructions, so that there is a fear that a wrong data is written into the RAM to destroy the data having been already stored in the RAM.

In order to solve the above problem inherent in the conventional electronic device, the device is generally provided with a manually operated switch For blocking off a chip-enable signal issued from the CPU to the RAM, and a manually operated reset switch for resetting the CPU. For replacing the main battery with a new one, a user of the device has to sequentially operate these manual switches in a predetermined order.

Replacement of the main battery with a new one is performed as follows. First of all, after the device is put in a stand-by mode, the manual switch is turned off so as to block off the chip-enable signal. Then, the old main battery is replaced with a new one. After that, the reset switch is manually operated so as to reset the CPU. Finally, the manual switch is turned on to permit the chip-enable signal to be applied to the RAM. Through the above sequential manual operation conducted by the user, it is possible to prevent the stored data from being destroyed even if the CPU runs away during the replacement of the main battery.

However, since it is necessary for the user to manually operate the switches sequentially, there is a fear that the user will make some mistakes in the above manual operation to cause the stored data to be destroyed. Furthermore, even when the above manual operation is properly conducted by the user, there is still a fear that the CPU runs away to cause the stored data to be destroyed when the new main battery now set in the device can not supply, to the RAM, sufficient power necessary for maintaining the stored data in the RAM.

SUMMARY OF THE INVENTION

It is therefore an object of the present invention to provide a stored data protection apparatus For an electronic device having a computer, by which the stored data in a volatile memory of the device can be prevented from being destroyed when a main battery is replaced with a new one.

It is another object of the present invention to provide a stored data protection apparatus in which a stored data is prevented from being destroyed even when a replaced new main battery can not supply sufficient power, to a volatile memory, necessary for maintaining the stored data in the volatile memory.

According to the present invention, a stored data protection apparatus for an electronic device has a CPU and a volatile memory controlled by the CPU for storing data therein. Both of the CPU and the volatile memory are supplied power voltage from a main battery in normal operation of the device. The volatile memory is supplied power voltage from a back-up battery when the main battery is removed from the device so as to prevent the data stored in the volatile memory from being destroyed. The apparatus has a switch operable in first and second positions, taking the first position in the normal operation of the device, and being switched from the first position to the second position when the main battery is removed from the device, a circuit for inhibiting the CPU to access the volatile memory when the switch is in the second position, and a circuit for releasing the inhibition of the CPU by means of the inhibiting circuit when the switch is switched from the second position to the first position.

The apparatus according to the present invention may further have a first detection circuit for detecting that power supply voltage From the main battery is lower than a first predetermined voltage, and a release preventing circuit for preventing the releasing circuit from releasing the inhibition of the CPU when the first detection circuit detects that the supply voltage is lower than the first predetermined value.

In the present invention having the above construction, the switch is interlocked with a main battery housing portion of the device (in which housing portion the main battery should be received), so that the switch is switched from the normally open position to the second closed position when the main battery is removed from the housing portion of the device, whereby the inhibiting circuit automatically inhibits the CPU to access the volatile memory in a condition in which the switch is switched to the second position. On the other hand, after completion of the replacement of the main battery with a new one, and after the switch has been switched from the second position to the first position, the releasing circuit releases the CPU from the inhibitory condition thereof by the use of a reset pulse.

In addition, in the present invention, the first detection circuit determines whether or not the supply voltage from the main battery is lower than the predetermined value. In the case where the supply voltage of the main battery is higher than the predetermined value, as described above, the releasing circuit automatically releases the CPU from the inhibitory condition by the use of the reset pulse. In contrast with this, in the case where the supply voltage of the main battery is lower than the predetermined value, the release preventing circuit inhibits the releasing circuit From performing its releasing operation of the CPU by blocking off the reset pulse.

Consequently, it is possible without fail for the stored data protection apparatus of the present invention to protect the stored data stored in the volatile memory from being destroyed. Therefore, in the stored data protection apparatus of the present invention for the device, there is no fear that the stored data stored in the volatile memory means is destroyed even when the user sets a main battery which has already been exhausted in the device by mistake.

It is preferable that the switch is kept in the on state during a replacement operation of the main battery and in the off state in normal operation of the device.

The switch may be connected to the CPU so as to reset the CPU when the switch itself turns off.

It is preferable that the inhibiting circuit includes a circuit for preventing an enable signal applied from the CPU from being transmitted to the volatile memory when the switch is in the second position.

The above preventing circuit may include a gate connected to the CPU to receive the enable signal therefrom and a flip-flop for keeping the gate closed when the switch is in the second position.

It is preferable that the releasing circuit includes a circuit for resetting the flip-flop when the switch is switched from the second position to the first position.

The resetting circuit may include a pulse generation circuit for producing a pulse signal when the switch is switched from the second position to the first position.

The above preventing circuit may include a second detection circuit for detecting that power supply voltage from the back-up battery is lower than a second predetermined voltage, and a circuit for blocking the flip-flop From being reset when the second detection circuit detects that the supply voltage is lower than the second predetermined value.

Further objects and advantages of the present invention will be apparent from the following description of the preferred embodiment of the present invention as illustrated in the accompanying drawings.

BRIEF DESCRIPTION OF THE DRAWINGS

FIG. 4 shows time charts of essential signals used in the stored data protection apparatus of FIG. 3.

DETAILED DESCRIPTION OF THE PREFERRED EMBODIMENTS

Hereinbelow, a preferred embodiment of the present invention will be described in detail with reference to the accompanying drawings.

Figure 1:
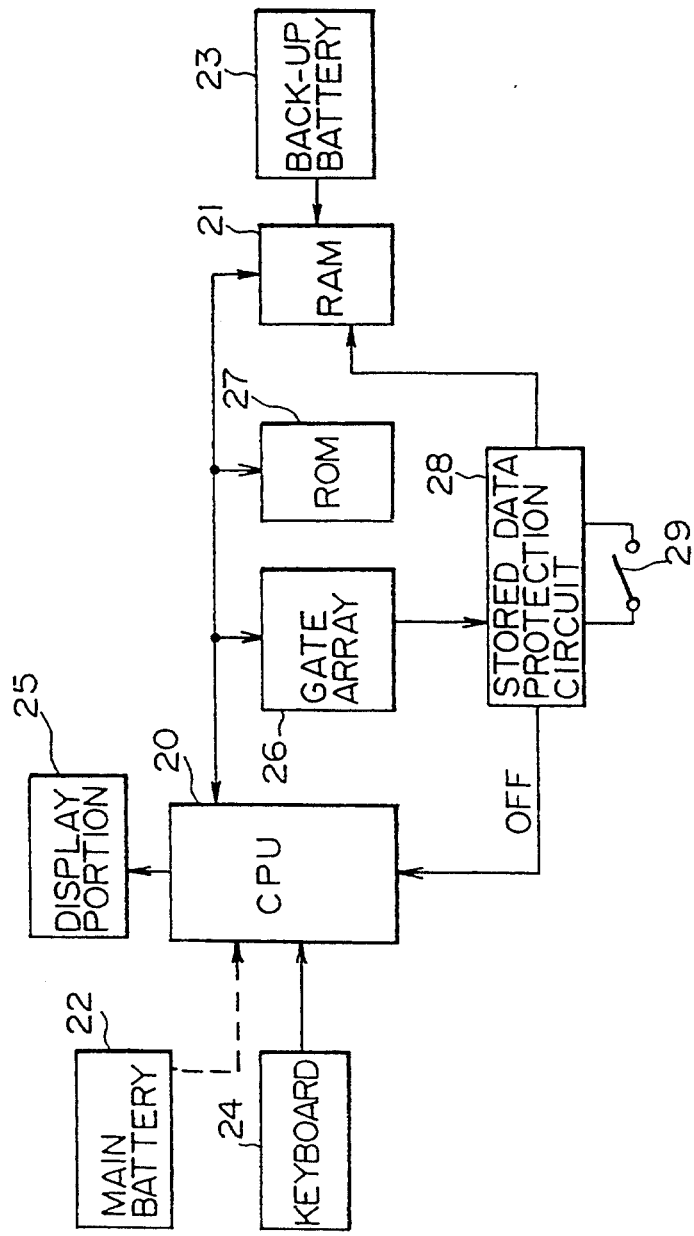
FIGS. 1 and 2 schematically show electrical construction of an electronic device of a preferred embodiment according to the present invention.
Figure 2:
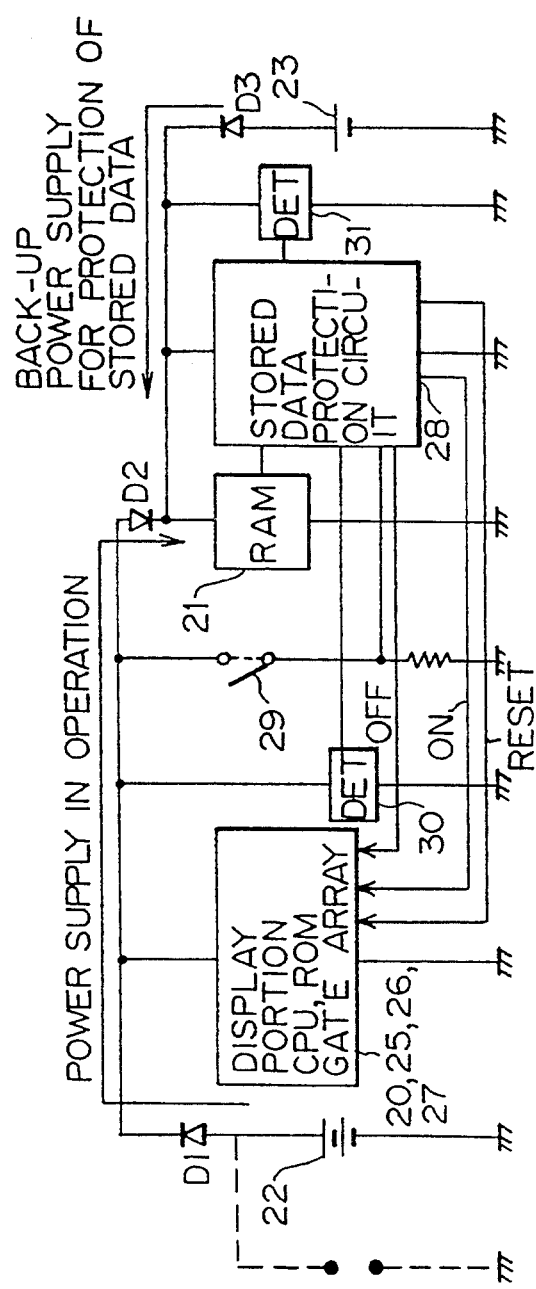

FIGS. 1 and 2 are schematic block diagrams of an electronic device, for example such as electronic notebooks, pocket computers and the like, in which a stored data protection apparatus 28 of the present invention is incorporated.

As shown in these figures, a main battery 22 is so coupled with the electronic device as to supply power source voltage to a CPU (Central Processing Unit) 20 and like elements through a diode D1, which power source voltage is further supplied to a RAM (Random Access Memory) 21 through the diode D1 and a diode D2. On the other hand, a back-up battery 23 for preventing a stored data from being destroyed is so coupled with the device as to supply its power source voltage to the RAM 21 through a diode D3. Consequently, the CPU 20 receives the power source voltage supplied from the main battery 22 to perform various control operations. On the other hand, the RAM 21 receives the power source voltage supplied from each of the main battery 22 and the back-up battery 23 to maintain the stored data therein.

As is clear from FIGS. 1 and 2, the device having the stored data protection apparatus 28 of the present invention is further provided with a keyboard 24 for allowing an operator to input various data to the device, a display portion 25 for showing various data, a gate array 26 for producing various signals, and a ROM (Read Only Memory) 27 for storing various programs for the CPU 20, various dictionary data and the like data. As shown in FIG. 1, the main battery 22 supplies its power source voltage to each of the display portion 25, gate array 26 and the ROM 27.

The electronic device also has the stored data protection apparatus 28 which will be described in detail later, a switch 29 disposed at a housing portion of the device, in which the main battery 22 is received. This switch 29 is so operated as to turn on to a closed position manually or preferably automatically when the operation of taking out the main battery 22 from the housing portion for replacing it with a new one is carried out as indicated by the dashed lines in FIGS. 1 and 2. For example, the switch 29 may cooperate with a cover member of the housing portion for the main battery 22 so as to turn on to the dashed line position when the cover member is opened.

The device is further provided with voltage detection circuits 30 and 31 which output L level (low level) detection signals to the stored data protection circuit 28, respectively, when the power source voltages supplied from the main battery 22 and the back-up battery 23 are lower than a predetermined voltage necessary for maintaining the data stored in the RAM 21.

Figure 3:
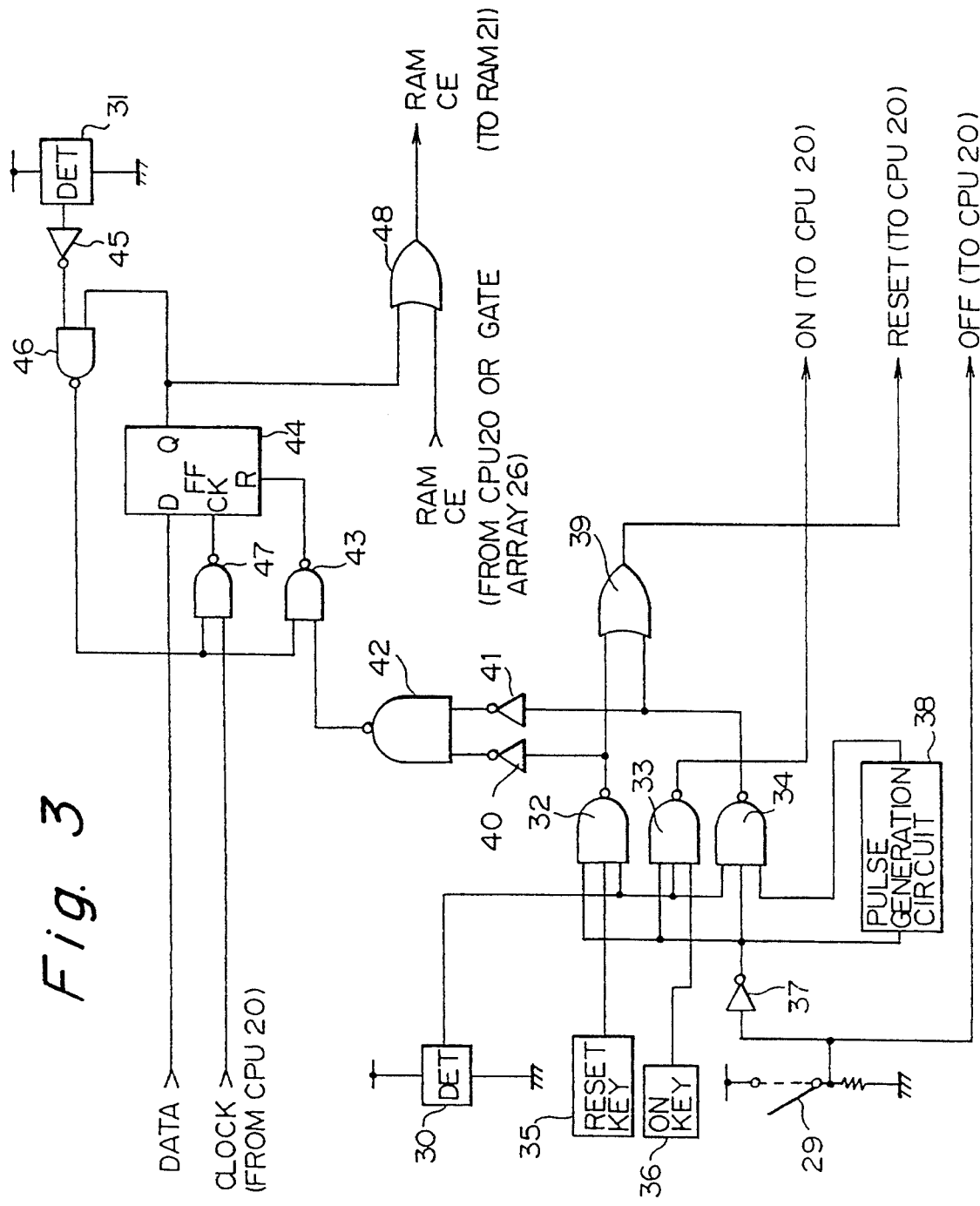
FIG. 3 shows electrical construction of a stored data protection apparatus of the device shown in FIGS. 2 and 3.

FIG. 3 is a block diagram of an embodiment of the stored data protection apparatus 28 shown in FIGS. 1 and 2. Hereinafter, the stored data protection circuit 28 will be described in detail with reference to this figure.

The voltage detection circuit 30 for detecting the power source voltage of the main battery 22 (shown in FIGS. 1 and 2) outputs a detection signal to each of three-inputs NAND gates 32, 33, and 34. In this example of the stored data protection apparatus 28, a reset key 35 used for manually resetting the CPU 20, and a ON key 36 used for manually initiating operation of the CPU 20 are additionally provided. When the reset key 35 and the ON key 36 are turned on, the power supply voltage from the main battery 22 are fed to the NAND gates 32 and 33, respectively.

When the switch 29 is turned on or closed as shown in the dashed line position the power source voltage from the main battery 22 is fed, as an output signal of the switch 29, to each of the NAND gates 32, 33, and 34 through an inverter 37. On the other hand, at this time, a pulse generation circuit 38 produces a pulse signal and feeds it to the NAND gate 34. The output signal from the switch 29 is further fed to an OFF-signal input terminal (not shown) of the CPU 20. An output terminal of the NAND gate 33 is connected to an ON-signal input terminal (not shown) of the CPU 20, so that the CPU 20 is changed to an ON mode condition upon receipt of an output signal from the NAND gate 33.

The switch 29 is kept in off (open) state when the main battery 22 is not replaced. During the operation of taking out the main battery 22 from the housing portion for replacing it with a new one, the switch 29 is manually or preferably automatically turned on. For example, when the cover member of the housing portion is opened, it will be turned on and thus the power source voltage from the main battery 22 is fed from this switch 29.

Therefore, in normal operation of the device in which the main battery 22 is not replaced, the output signal from the switch 29 is in a L level. For replacement of the main battery 22, if the cover member of the housing portion is opened, the switch 29 is turned on to produce an output signal in a H level or OFF signal to CPU 20 (high level). In other words upon replacement of the main battery 22 with a new one, the output signal produced from the switch 29 is changed in level from the L level to the H level. Then, when the main battery 22 is removed from the housing portion of the device, the output signal from the switch 29 becomes on in the L level again even when the switch 29 remains in on state.

When a new main battery 22 is set in the housing portion of the device, the output signal from the switch 29 becomes on in the H level before the switch 29 is turned on. Then, after completion of setting of the main battery 22 in the housing portion of the device, and after the switch 29 is turned off, for example by closing the cover member, the output signal from the switch 29 becomes on in the L level.

An output terminal of the NAND gate 32 is connected to an input terminal of an OR gate 39 and an input terminal of an inverter 40. On the other hand, the output terminal of the NAND gate 34 is connected to the other input terminal of the OR gate 39 and an input terminal of an inverter 41. An output terminal of the OR gate 39 is connected to a reset terminal (not shown) of the CPU 20 for resetting itself in operation.

Output terminals of the inverters 40 and 41 are connected to a pair of input terminals of a NAND gate 42, respectively. An output terminal of the NAND gate 42 is connected to an input terminal of a NAND gate 43 which has its output terminal connected to a reset terminal R of a D flip-flop 44.

The detection signal outputted from the voltage detection circuit 31 for detecting the power supply voltage from the back-up battery 23 (shown in FIGS. 1 and 2) is applied to one of input terminals of a NAND gate 46 having an output terminal connected to input terminals of NAND gates 43 and 47.

An input terminal D of the D flip-flop 44 is connected to a data bus DATA of the device. A clock terminal CK thereof is connected to an output terminal of the NAND gate 47 having an input terminal to which clock signals CLOCK are applied from the CPU 20. An output terminal Q of the flip-flop 44 is connected to the other input terminal of the NAND gate 46 and to an input terminal of an OR gate 48. To the other terminal of the OR gate 48, a chip-enable signal CE produced from the CPU 20 or the gate array 26 is applied. An output terminal of the OR gate 48 is connected to the RAM 21. The chip-enable signal CE disables the RAM 21 from operation at H level, and enables the RAM 21 at L level.

FIG. 4 is a timing chart of essential signals used in the stored data protection apparatus 28 shown in FIG. 3. Now, the embodiment of the present invention will be described in detail with reference to FIG. 4.

In the removal operation of the main battery 22 from the electronic device, first of all, the switch 29 is turned on so that the power source voltage of the main battery 22 is supplied to the stored data protection circuit 28, where by an OFF signal is applied to the CPU 20 causing the CPU 20 to change in an OFF mode. Namely, as is clear from FIG. 3, immediately after the switch 29 is turned on, the OFF signal is applied to the CPU 20. After completion of the removal of the main battery 22 from the device, as shown in FIG. 4, the power supply from the main battery 22 gradually decreases to zero, to make it impossible to supply the power source voltage of the main battery 22 to the stored data protection circuit 28. As a result, as shown in FIG. 4, the output signal from the switch 29 becomes a L level or OFF mode.

Upon receipt of the OFF signal from the switch 29, the CPU 20 performs its OFF process so as to put the device in a stand-by mode. Namely, the CPU 20 outputs data DATA and clock signals CLOCK to the stored data protection circuit 28. In the circuit 28, the data DATA and clock pulses CLOCK are applied to the input terminal D and the clock terminal CK of the D flip-flop 44, respectively, to latch the flip-flop 44. Thus a signal being in the H level is outputted from the output terminal Q of the flip-flop 44. As a result, the output signal from the OR gate 48 is fixed in the H level regardless of the presence of the chip-enable signal CE from the CPU 20 or from the gate array 26, to prevent implementation of a write cycle for the RAM 21.

Incidentally, even when the main battery 22 is removed from the device, as shown by the arrow in FIG. 2, the back-up battery 23 supplies power source voltage to the RAM 21 in place of the main battery 22 to enable the RAM 21 to protect the stored data.

After the main battery 22 is removed from the device, the power source voltage supplied from the back-up battery 23 gradually decreases due to its backup service, so that a loss of power of the battery 23 is detected by the voltage detection circuit 31. As a result, an output signal from the detection circuit 31 changes in the L level, as shown in FIG. 4, causing an output signal of the inverter 45 to change in the H level. Consequently, the NAND gate 46 produces an output signal in the L level, so that both of the NAND gates 43 and 47 have output signals fixed in the H level. Thus, both of the clock signals CLOCK from the CPU 20 and the reset signal from the NAND gate 42 are blocked off to maintain the flip-flop 44 being latched.

After completion of the replacement of the main battery 22 with a new one, the new main battery 22 supplies the power source voltage, as shown in FIG. 4. Under such circumstance, when the switch 29 is turned off for example by closing the cover member of the housing portion, the output signal from the inverter 37 is switched from the L level to the H level, causing the pulse generation circuit 38 to produce a pulse.

Now, the operation will be divided into the following two modes depending upon whether or not the power source voltage supplied form the new main battery 22 is lower than a predetermined voltage necessary for implementation of proper operation of the device.

First, in case that the power source voltage of the new main battery 22 is higher than the predetermined value, as shown in FIG. 4. The output signal from the voltage detection circuit 30 becomes in the H level, so that the above pulse produced in the pulse generation circuit 38 is applied to the reset terminal R of the D flip-flop 44 through the NAND gate 34, inverter 41, NAND gate 42, and the NAND gate 43. In addition, a reset signal shown in FIG. 4 is applied to the reset terminal of the CPU 20 through the OR gate 39, so that the D flip-flop 44 is released from its latched mode and the CPU 20 is automatically reset, to allow the chip-enable signal CE from the CPU 20 or the gate array 26 to enter the RAM 21 through the OR gate 48. As is clear from the above description, even when the CPU 20 runs away during the replacement of the main battery 22, there is no fear that the stored data stored in the RAM 21 is destroyed, because the CPU 20 is automatically reset without fail.

On the other hand, in case that the power source voltage supplied from the new battery power pack 22 is lower than the predetermined value necessary for implementation of proper operation of the device, the output signal from the voltage detection circuit 30 becomes in the L level, so that the signals from the reset key 25 and the ON key 36 are blocked off together with the pulse from the pulse generation circuit 38 by means of the NAND gates 32, 33, and 34. Consequently, the D flip-flop 44 remains latched so that the chip-enable signal CE from the CPU 20 or the gate array 26 is blocked off by the OR gate 48. Namely, in case that the power source voltage of the new main battery 22 is lower than the predetermined value, it is impossible for the user to use the device, i.e., the chip-enable signal CE is blocked off so as to protect the stored data stored in the RAM 21 from being destroyed. Therefore, even when the user sets the main battery 22, which has been previously exhausted, in the device by mistake, there is no fear that the stored data of the RAM 21 is destroyed.

Many widely different embodiments of the present invention may be constructed without departing from the spirit and scope of the present invention. Consequently, it should be understood that the present invention is not limited to the specific embodiments described in the specification, except as defined the appended claims.

What is claimed is:

1. A stored data protection apparatus for an electronic device, said device having a CPU and a volatile memory which is controlled with an enabling signal from said CPU for storing data therein, both of said CPU and said volatile memory being supplied power voltage from a main battery when said main battery is connected in said device, and said volatile memory being supplied power voltage from a back-up battery when said main battery is removed from said device so as to prevent the data stored in the volatile memory from being destroyed, said apparatus comprising:

a switching means operable between a first position and a second position, and taking the first position when said main battery is connected in said device, and being switched from the first position to the second position prior to said main battery being removed from said device, including means for supplying an off signal to the CPU when said switching means is switched to the second position, said CPU supplying setting signals to said stored data protection apparatus and shifting to a standby mode upon receiving said off signal;

means for inhibiting said CPU from accessing said volatile memory in response to said switching means being in the second position, including a gate means connected to said CPU for receiving said enabling signal from said CPU and supplying the enabling signal to said volatile memory when said switching means is in the first position, and a flip-flop means for preventing said gate means from supplying said enabling signal to said volatile memory when said switching means is in the second position, said flip-flop means being connected to receive said setting signals and to be set by said setting signals from said CPU to prevent said gate means from supplying said enabling signal to the volatile memory; and means for releasing an accessing inhibition of said CPU by means of said inhibiting means in response to said switching means being switched from the second position to the first position, including a pulse generating means for generating a reset pulse to be supplied to said flip-flop means to reset said flip-flop means and to said CPU to reset said CPU in response to said switching means being switched from the second position to the first position.

2. An apparatus as claimed in claim 1, wherein said switching means includes a switch being kept in an on state during a replacement operation of said main battery and in an off state when said main battery is connected in said device.

3. An apparatus as claimed in claim 2, wherein said means for releasing includes logic means responsive to said reset pulse and being connected to said CPU so as to reset said CPU in response to said switch being switched from the second position to the first position.

4. An apparatus as claimed in claim 1, wherein said apparatus further comprises a first detection means for detecting that power supply voltage from said main battery is lower than a first predetermined voltage, and a release preventing means for preventing said releasing means from releasing the inhibition of said CPU when said first detection means detects that said power supply voltage is lower than said first predetermined voltage.

5. An apparatus as claimed in claim 4, wherein said inhibiting means further includes a second detection means for detecting that power supply voltage from said back-up battery is lower than a second predetermined voltage, and means for preventing said flip-flop means from being reset when said second detecting means detects that said power supply voltage is lower than said second predetermined voltage.

* * * * *